US 9,324,982 B2
Apr. 26, 2016

(54) BATTERY MODULE

(75) Inventor: Seong-Joon Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 145 days.

(21) Appl. No.: 13/598,699

(22) Filed: Aug. 30, 2012

(65) Prior Publication Data

US 2013/0252063 A1 Sep. 26, 2013

(30) Foreign Application Priority Data

Mar. 23, 2012 (KR) .................. 10-2012-0030030

(51) Int. Cl.
| | |
|---|---|
| *H01M 2/10* | (2006.01) |
| *H01M 2/14* | (2006.01) |
| *H01M 2/34* | (2006.01) |
| *H01M 10/42* | (2006.01) |
| *H01M 2/16* | (2006.01) |
| *H01M 2/18* | (2006.01) |

(52) U.S. Cl.
CPC .............. *H01M 2/1077* (2013.01); *H01M 2/14* (2013.01); *H01M 2/34* (2013.01); *H01M 10/42* (2013.01); *H01M 2/16* (2013.01); *H01M 2/18* (2013.01)

(58) Field of Classification Search
CPC ... H01M 2/10; H01M 10/50; H01M 10/5034; H01M 10/42; H01M 2/0245; H01M 2/0247; H01M 2/025; H01M 2/1015; H01M 2/1061; H01M 10/625; H01M 10/647; H01M 10/6556; H01M 10/613; H01M 10/6557; H01M 10/6555; H01M 10/6554; H01M 10/6551; Y02E 60/12; Y02E 60/122
USPC .................................................. 429/120, 159
See application file for complete search history.

(56) References Cited

U.S. PATENT DOCUMENTS

| | | | | |
|---|---|---|---|---|
| 5,639,571 | A  * | 6/1997 | Waters et al. .................. 429/71 |
| 6,376,126 | B1 * | 4/2002 | Faust ..................... H01M 2/024 |
| | | | | 429/176 |
| 6,489,054 | B2 * | 12/2002 | Cheiky et al. ................. 429/185 |
| 9,142,809 | B2 * | 9/2015 | Kim ..................... H01M 2/0245 |
| 2005/0042511 | A1* | 2/2005 | Kaneta .......................... 429/185 |
| 2009/0061299 | A1* | 3/2009 | Uchida et al. ................. 429/156 |
| 2009/0297936 | A1* | 12/2009 | Nemoto .............. H01M 2/1077 |
| | | | | 429/152 |

FOREIGN PATENT DOCUMENTS

| | | |
|---|---|---|
| JP | 11-126585 | 5/1999 |
| JP | 2003-317795 | 11/2003 |
| JP | 2005-197179 | 7/2005 |
| JP | 2007-165698 | 6/2007 |
| JP | 2008-124033 | 5/2008 |
| JP | 2010-049842 | 3/2010 |
| JP | 2011-096465 | 5/2011 |
| KR | 10-2007-0014633 A | 2/2007 |
| KR | 10-2007-0025735 A | 3/2007 |
| KR | 10-2007-0101025 A | 10/2007 |

OTHER PUBLICATIONS http://www.hrssilicone.com/eng/main.htm (snapshot captured Jul. 2011).*

* cited by examiner

*Primary Examiner* — Ula C Ruddock
*Assistant Examiner* — Lisa S Park
(74) *Attorney, Agent, or Firm* — Lee & Morse, P.C.

(57) ABSTRACT

A battery module including a plurality of unit batteries disposed in one direction, and barriers between the plurality of unit batteries, each barrier including an inner region and an outer region, the inner region having elasticity and the outer region being located in a vicinity of the inner region and having greater hardness than the inner region.

20 Claims, 9 Drawing Sheets

BATTERY MODULE

CROSS REFERENCE TO RELATED APPLICATION

This application claims the benefit under 35 U.S.C. §119 of Korean Patent Application No. 10-2012-0030030, filed in the Korean Intellectual Property Office on Mar. 23, 2012, the disclosure of which is incorporated herein in its entirety by reference.

BACKGROUND

1. Field

One or more embodiments relate to a battery module.

2. Description of the Related Art

Typically, secondary batteries are rechargeable, unlike primary batteries that are not rechargeable.

When secondary batteries are used as a power source for small electric devices, such as notebook computers, they may be used as single batteries. When secondary batteries are used in large-scale transport vehicles, such as hybrid vehicles, they may be provided in a battery module that connects and binds a plurality of the batteries into one unit, in accordance with a demand for high-output and high-capacity batteries.

SUMMARY

Embodiments are directed to a battery module including a plurality of unit batteries disposed in one direction, and barriers between the plurality of unit batteries, each barrier including an inner region and an outer region, the inner region having elasticity and the outer region being located in a vicinity of the inner region, the outer region having greater hardness than the inner region. The inner region and the outer region may be formed of different materials.

Each barrier may include a plurality of holes. The inner region may include a cured elastic material filling the plurality of holes.

The plurality of holes may be located along a perimeter of the inner region at a location where the inner region and the outer region contact each other.

Each barrier may be disposed between a neighboring first unit battery and a neighboring second unit battery among the plurality of unit batteries. A first surface of the inner region may face the first unit battery. A second surface of the inner region opposite to the first surface may face the second unit battery. The inner region may absorb volume expansions of the first unit battery and the second unit battery. The inner region may be formed of silicone or rubber.

The outer region may be formed of a plastic material, a reinforced plastic material, or a metallic material having an insulated outer surface.

An elasticity of the inner region may increase in a direction from a portion of the inner region contacting the outer region to a center of the inner region. The outer region may be non-elastic.

At least one of the inner region and the outer region may further include protruding portions that protrude toward the plurality of unit batteries.

Embodiments are also directed to a battery module including a plurality of unit batteries disposed in one direction, barriers disposed between the plurality of unit batteries, and a housing surrounding the plurality of unit batteries between which the barriers are disposed, wherein each of the barriers includes a soft inner region formed of an elastic material and located in a center of each barrier and a hard outer region formed in a vicinity of the inner region and surrounding the inner region. The elastic material may include silicone or rubber.

Each barrier may include a plurality of holes. The inner region may include a cured elastic material filling the plurality of holes.

The barriers may include protruding portions that protrude toward neighboring unit batteries between which the barriers are disposed.

The protruding portions may include protruding portions in the outer region. The protruding portions that are in the outer region maintain a constant space between the neighboring unit batteries.

The inner region may absorb volume expansions of the neighboring unit batteries and may be elastically deformable.

The outer region may be formed of a plastic material, a reinforced plastic material, or a metallic material having an insulated outer surface.

The elasticity of the inner region may increase in a direction from a portion of the inner region contacting the outer region to the center of the inner region.

The inner region may include a first inner region adjacent to the outer region and a second inner region located inside the first inner region. An elasticity of the second inner region may be greater than an elasticity of the first inner region.

Cooling holes may be formed in sides of the housing at locations corresponding to the barriers.

BRIEF DESCRIPTION OF THE DRAWINGS

Features will become apparent to those of ordinary skill in the art by describing in detail exemplary embodiments with reference to the attached drawings in which:

FIG. 4A shows a pre-formed barrier before an inner region is formed, and FIG. 4B shows a barrier after the inner region is formed;

FIG. 5A shows a pre-formed barrier before an inner region is formed, and FIG. 5B shows a barrier after the inner region is formed;

DETAILED DESCRIPTION

Figure 1:
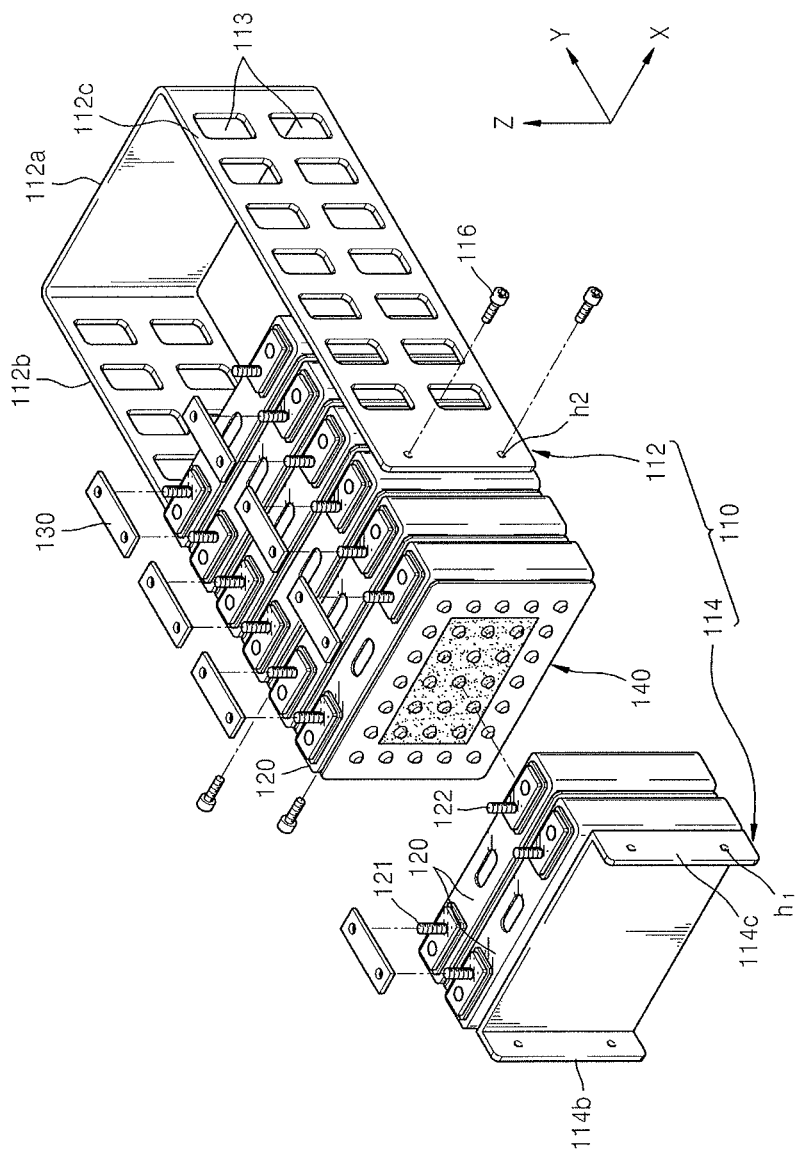
FIG. 1 illustrates a schematic exploded perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art.

In the drawing figures, the dimensions of layers and regions may be exaggerated for clarity of illustration. Like reference numerals refer to like elements throughout.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises" and/or "comprising," when used in this specification, specify the presence of stated elements, steps, operations, and/or devices, but do not preclude the presence or addition of one or more other elements, steps, operations, and/or devices. It will also be understood that, although the terms first, second, etc. may be used herein to describe various elements, these elements should not be limited by these terms. These terms are only used to distinguish one element from another.

FIG. 1 is a schematic exploded perspective view of a battery module according to an embodiment. Referring to FIG. 1, the battery module includes a housing 110, a plurality of unit batteries 120 for performing charging and discharging operations, and barriers 140 disposed between the unit batteries 120.

The housing 110 may surround the unit batteries 120 between which the barriers 140 are disposed. For example, the housing 110 may include a restrainer 112 that surrounds the unit batteries 120, which may be arranged in a line, and an end plate 114 that is coupled to the restrainer 112.

The restrainer 112 may include a first surface 112a parallel to one side of the unit batteries 120, and second and third surfaces 112b and 112c extending approximately perpendicular to the first surface 112a to cover sides of the unit batteries 120. The end plate 114 may be parallel to the first surface 112a of the restrainer 112 and may be coupled to the restrainer 112. For example, the end plate 114 may include extension surfaces 114b and 114c parallel to the second and third surfaces 112b and 112c, respectively. The end plate 114 and the restrainer 112 may be coupled to each other by bolts 116 that penetrate holes h1 and h2 formed in the extension surfaces 114b and 114c and the second and third faces 112b and 112c while the extension surfaces 114b and 114c are disposed to contact the second and third surfaces 112b and 112c, respectively. Therefore, four surfaces of the unit batteries 120 may be restrained by the restrainer 112 and the end plate 114, and spaces therebetween may be maintained constant.

A plurality of cooling holes 113 may be formed in both sides of the restrainer 112, for example, in the second and third surfaces 112b and 112c. The cooling holes 113 may be formed in locations corresponding to the barriers 140 (which will be described below) so that external air may come into and go out of the cooling holes 113. For example, external air coming into the cooling holes 113 that are formed in the second surface 112b may pass through the barriers 140 formed between the neighboring unit batteries 120 and go out of the cooling holes 113 that are formed in the third surface 112c. Such a flow of air may enable heat generated by the unit batteries 120 to be easily dissipated.

The unit batteries 120 may include first electrodes 121 and second electrodes 122 with opposite polarities. The first electrodes 121 and the second electrodes 122 form electrical connections to discharge electric power stored inside a battery cell to the outside or to receive electric power from the outside.

Although not shown, the each of the unit batteries 120 may include an electrode assembly as a power generation element, the electrode assembly including a first electrode plate, a second electrode plate, and a separator disposed therebetween. The electrode assembly may be formed by winding the separator disposed between the first electrode plate and the second electrode plate in a roll shape. The first electrodes 121 may be electrically connected to the first electrode plate, and the second electrodes 122 may be electrically connected to the second electrode plate, so that the first electrodes 121 and the second electrodes 122 may be used to perform charging and discharging operations.

The unit batteries 120 may be disposed parallel to each other in a thickness direction of the unit batteries 120, i.e. in a direction y. The unit batteries 120 may be electrically connected to each other via bus bars 130. For example, the neighboring unit batteries 120 may be connected in series to each other via the bus bars 130. In other implementations, serial connections and parallel connection may be combined.

The barriers 140 may be disposed between the unit batteries 120 to maintain constant spaces between the unit batteries 120, to support sides of the unit batteries 120, and to allow the passage of air between the unit batteries. The barriers 140 may absorb volume expansions of the unit batteries 120 due to swelling of the unit batteries 120.

The structure of the barriers 140 will now be described in more detail with reference to FIGS. 2A, 2B, 3A and 3B.

Figure 2A:
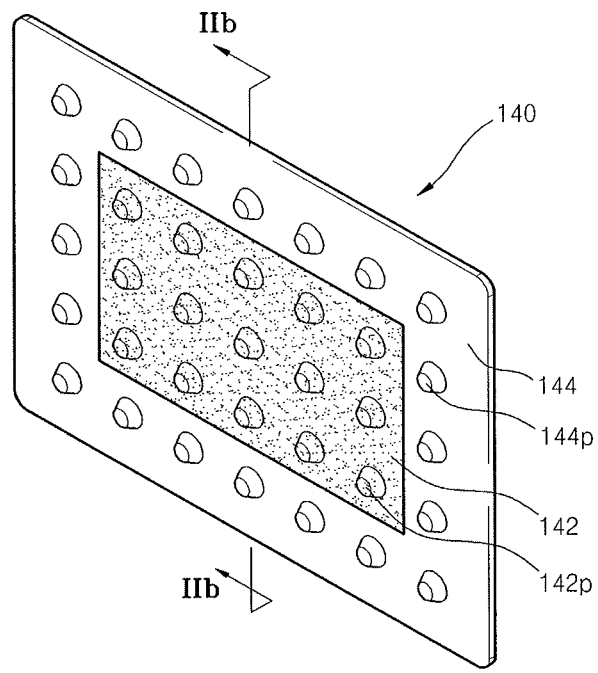
FIG. 2A illustrates a perspective view of a barrier of FIG. 1.
Figure 2B:
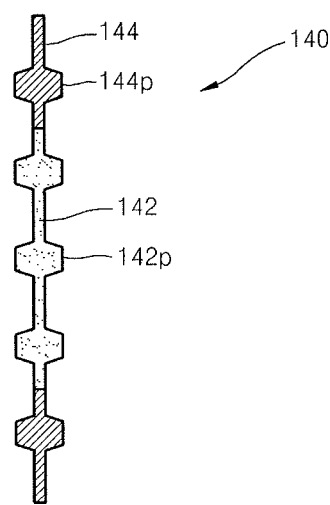
FIG. 2B illustrates a cross-sectional view of the barrier taken along a line IIb-IIb of FIG. 2A.
Figure 3A:
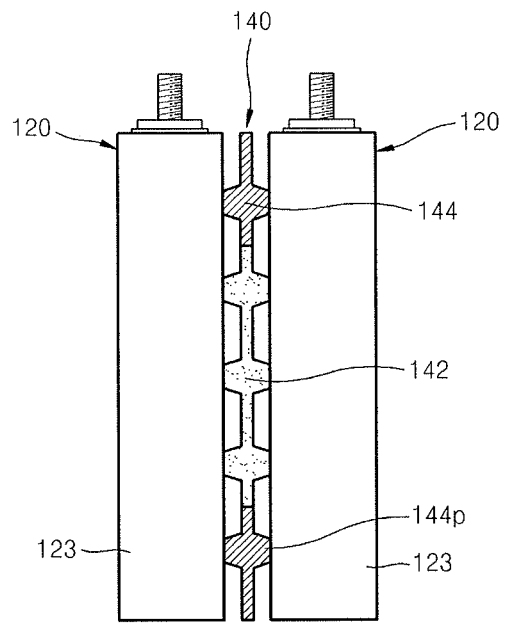
FIG. 3A illustrates a cross-sectional view of a barrier disposed between unit batteries before a swelling phenomenon occurs.
Figure 3B:
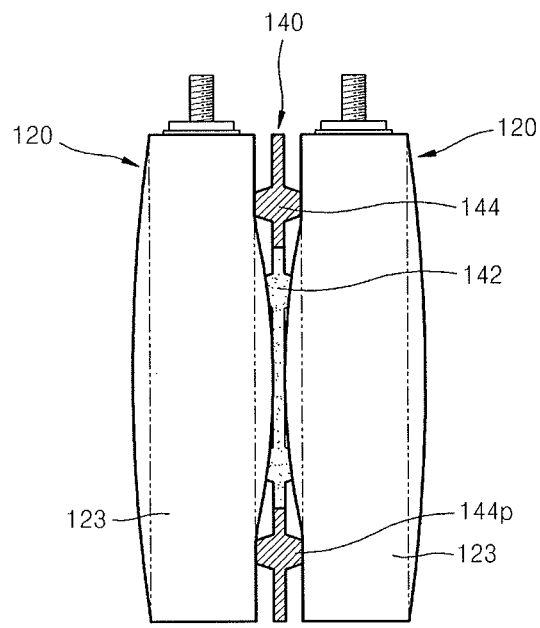
FIG. 3B illustrates a cross-sectional view of a barrier disposed between unit batteries after a swelling phenomenon occurs.

FIG. 2A is a perspective view of the barrier 140 of FIG. 1. FIG. 2B is a cross-sectional view of the barrier 140 taken along a line IIb-IIb of FIG. 2A. FIG. 3A is a cross-sectional view of the barrier 140 disposed between the unit batteries 120 before a swelling phenomenon of the unit batteries 120 occurs. FIG. 3B is a cross-sectional view of the barrier 140 disposed between the unit batteries 120 after a swelling phenomenon of the unit batteries 120 occurs.

Referring to FIGS. 2A and 2B, the barrier 140 may include protruding portions 142p and 144p formed to protrude toward the neighboring unit batteries 120 between which the barrier 140 is disposed. The protruding portions 142p and 144p may form paths along which air flows between the neighboring unit batteries 120. Thus, as described with reference to FIG. 1, above, the protruding portions 142p and 144p and the cooling holes 113 formed in both sides of the restrainer 112 may form air flow paths, thereby reducing heat generated by the unit batteries 120.

The barrier 140 may include an inner region 142 disposed in the center thereof and an outer region 144 surrounding the inner region 142 in a vicinity of the inner region 142.

The inner region 142 may be formed of a material softer than the material of the outer region 144. The inner region 142 may have elasticity. For example, the inner region 142 may include an elastic material such as rubber or silicone. The inner region 142 may absorb volume expansions due to a swelling phenomenon of the neighboring unit batteries 120 between which the barrier 140 is disposed.

In a case where a protection circuit that protects the unit batteries 120 does not normally operate, or in a case where an unexpected erroneous reaction occurs in the unit batteries 120 during the use of a battery module, gas may be generated according to a chemical reaction inside the unit batteries 120. An inner pressure of the unit batteries 120 may increase, and thus, a swelling phenomenon, in which the cases 123 of the unit batteries 120 swell, may take place.

Therefore, the unit batteries 120 of FIG. 3A may become swollen with respect to a center region of the unit batteries 120 facing the intervening barrier 140 due to the swelling phenomenon, as shown in FIG. 3B. The inner region 142 of the barrier 140 may be formed of a soft material and may absorb the volume expansions of the unit batteries 120. Also, the inner region 142 may have elasticity. Accordingly, if the volume of the unit batteries 120 reverts back to the original state shown in FIG. 3A, the inner region 142 of the barrier 140 may be also be restored to its original state.

The outer region 144 may be formed of a material that is harder than that of the inner region 142. The outer region 144 may be non-elastic. The outer region 144 of the barrier 140 may be rigid (or hard), unlike the soft inner region 142. Accordingly, the outer region 144 may not be deformable. Thus, even when the unit batteries 120 are swollen, spaces between the unit batteries 120 disposed between the restrainer 112 and the end plate 114 may be maintained constant by the outer region 144. The outer region 144 of the barrier 140 may maintain the distances between the neighboring unit batteries 130, even though the unit batteries 120 are swollen, and thus, the structure of the battery module may be stably maintained.

Referring back to FIGS. 2A and 2B, the outer region 144 may be formed of a material having hardness greater than that of the inner region 142. Examples of the material of the outer region 144 may include a plastic material, a reinforced plastic material, or a metallic material. If a metallic material is used, the outer region 144 may be provided with an insulated outer surface. The outer region 144 may have a greater hardness than the inner region 142. Accordingly, the outer region 144 may enable spaces between the unit batteries 120 restrained by the restrainer 112 and the end plate 114 to be maintained constant. Thus, even though the inner region 142 is compressed and deformed in a direction y due to the volume expansions of the unit batteries 120 according to the swelling phenomenon, the outer region 144 may not be deformed. Accordingly, spaces between the unit batteries 120 may be maintained to be constant, and heat generated by the unit batteries 120 may be reduced as air flows along the paths formed by the protruding portions 144p.

A process of manufacturing the barrier 140 of FIGS. 2A and 2B will now be described.

Figure 4A:
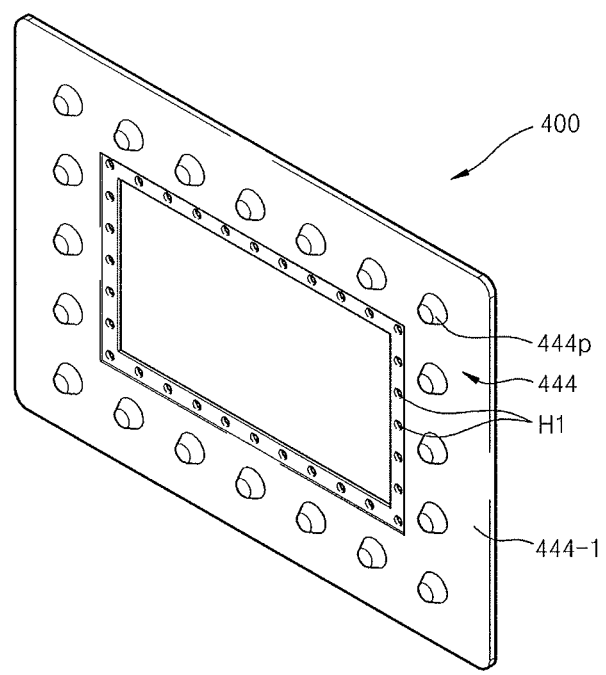
FIGS. 4A and 4B illustrate schematic perspective views for explaining stages of a process of manufacturing a barrier according to an embodiment.
Figure 4B:
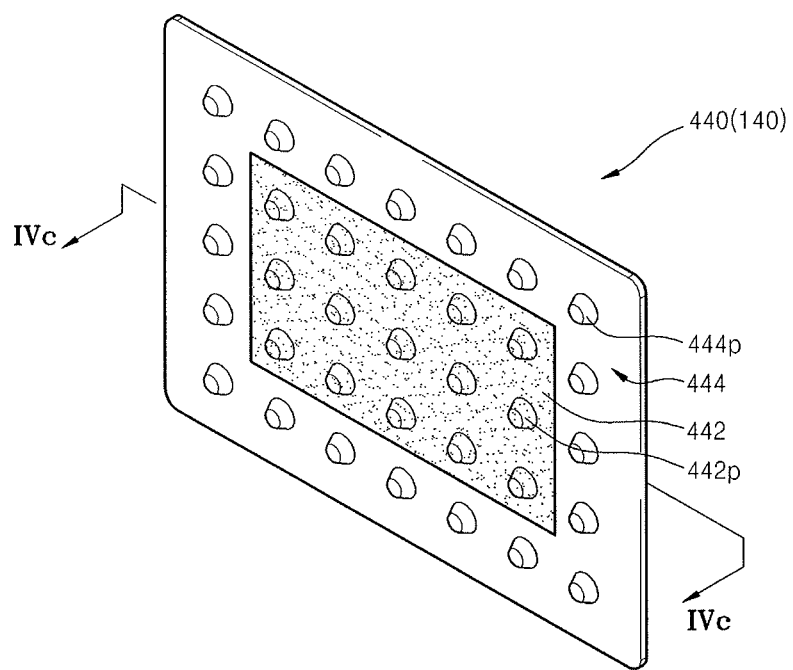
Figure 4C:
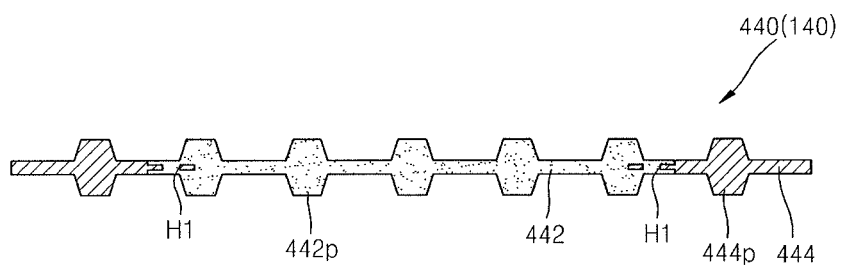
FIG. 4C illustrates a cross-sectional view of the barrier taken along a line IVc-IVc of FIG. 4B.

FIGS. 4A and 4B are schematic perspective views of a pre-formed barrier 400 and a barrier 440 for explaining stages of a manufacturing process according to an embodiment. FIG. 4C is a cross-sectional view of the barrier 440 taken along a line IVc-IVc of FIG. 4B.

Referring to FIG. 4A, the pre-formed barrier 400 including an outer region 444 may be prepared. The pre-formed barrier 400 may have a frame shape having an open portion corresponding to an inner region. A plurality of holes H1 may be formed along the perimeter adjacent to the open portion of the pre-formed barrier 400. A plurality of protruding portions 444p may be formed in a first side 444-1, and in a second side (not shown) opposite to the first side 444-1, of the outer region 444. The pre-formed barrier 400 may be formed of a plastic material, a reinforced plastic material, or a metallic material having an insulated outer surface.

The pre-formed barrier 400 may be placed in a mold (not shown). A resin material such as silicone or rubber may be injected through an inlet of the mold. The injected resin material may have an appropriate fluidity such that the injected resin material may fill the holes H1 formed along the perimeter adjacent to the open portion of the pre-formed barrier 400.

If the injected resin material is cured and then is separated from the mold, the barrier 440 in which an inner region 442 is formed may be completed as shown in FIG. 4B.

Referring to FIG. 4C, the resin material may fill the holes H1 and may be cured in a portion where the outer region 444 and the inner region 442 overlap each other. Even though secondary batteries apply pressure to the barrier 440, in particular, to the inner region 442 of the barrier 440, due to a swelling phenomenon, separation of the inner region 442 and the outer region 444 may be prevented.

Figure 5A:
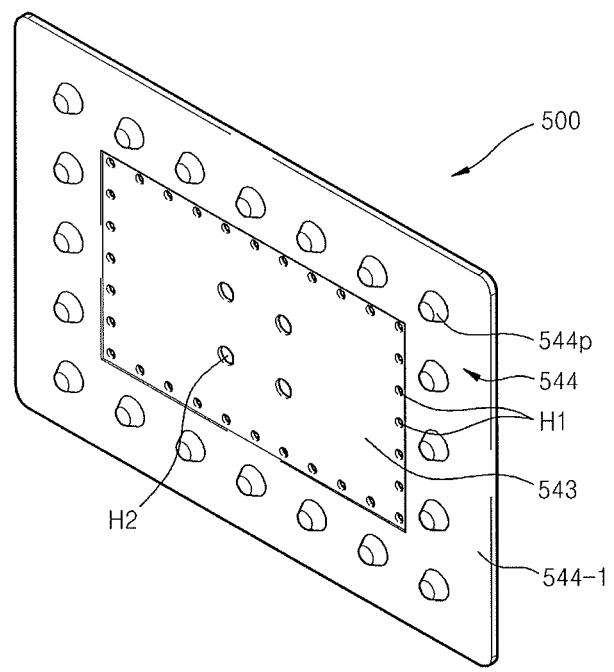
FIGS. 5A and 5B illustrate schematic perspective views for explaining stages of a process for manufacturing a barrier according to another embodiment.
Figure 5B:
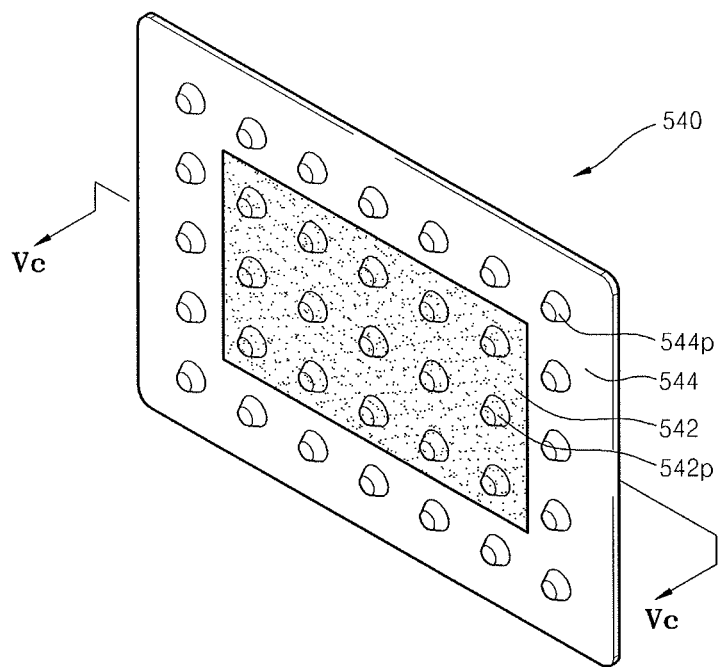
Figure 5C:
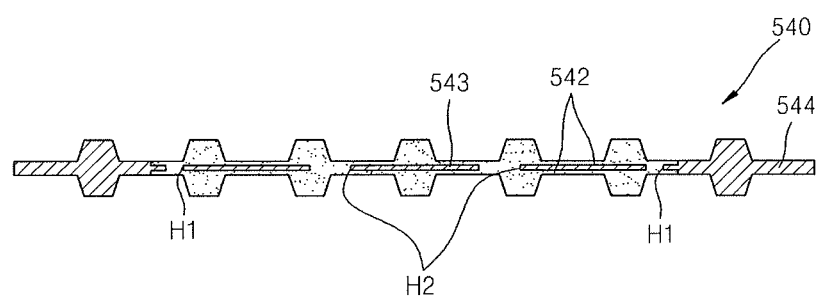
FIG. 5C illustrates a cross-sectional view of the barrier taken along a line Vc-Vc of FIG. 5B.

FIGS. 5A and 5B are schematic perspective views of barriers 500 and 540 for explaining stages of the manufacturing process thereof according to another embodiment. FIG. 5C is a cross-sectional view of the barrier 540 taken along a line Vc-Vc of FIG. 5B.

Referring to FIG. 5A, the pre-formed barrier 500 including an outer region 544 is prepared. Unlike the pre-formed barrier 400 described with reference to FIG. 4A, which has a frame shape having an open portion corresponding to an inner region, the outer region 544 of the pre-formed barrier 500 according to the present embodiment may have a closed surface (hereinafter referred to as an inner surface 543) corresponding to the inner region 542. A thickness of the inner surface 543 may be less than the thickness of the outer region 544, and may be less than the inner region 542 to be formed. Thus, a step-like shape may be formed where the inner perimeter of the outer region 544 and the outer perimeter of the inner surface 543 meet.

A plurality of holes H1 may be formed along the outer perimeter of the inner surface 543. At least one auxiliary hole H2 may be formed at a location of the inner surface 543 inside the outer perimeter. A plurality of protruding portions 544p may be formed in a first side 544-1 and a second side (not shown) opposite to the first side 544-1 of the outer region 544 outside of the inner surface 543. The pre-formed barrier 500 may be formed of a plastic material, a reinforced plastic material, or a metallic material having an insulated outer surface.

The pre-formed barrier 500 may be placed in a mold (not shown). A resin material such as silicone or rubber may be injected through an inlet of the mold. The injected resin material may have an appropriate fluidity such that the injected resin material may fill the holes H1 formed along the outer perimeter of the inner surface 543 and the auxiliary holes H2 formed in the inner surface 543.

Thereafter, if the injected resin material is cured and then is separated from the mold, the barrier 540 may be completed as shown in FIG. 5B.

Referring to FIG. 5C, the resin material may fill the holes H1 formed along the outer perimeter of the inner surface 543 and the auxiliary hole H2 also formed in the inner surface 543 and may be cured in a portion where the outer region 544 and the inner region 542 overlap each other, as described above. Thus, the inner region 542 of the barrier 540 and the outer region 544 of the barrier 540 may be firmly coupled to each other. Therefore, even though secondary batteries apply pressure to the barrier 540, in particular, to the inner region 542 of the barrier 540, due to a swelling phenomenon, separation of the inner region 542 and the outer region 544 may be prevented.

Figure 6:
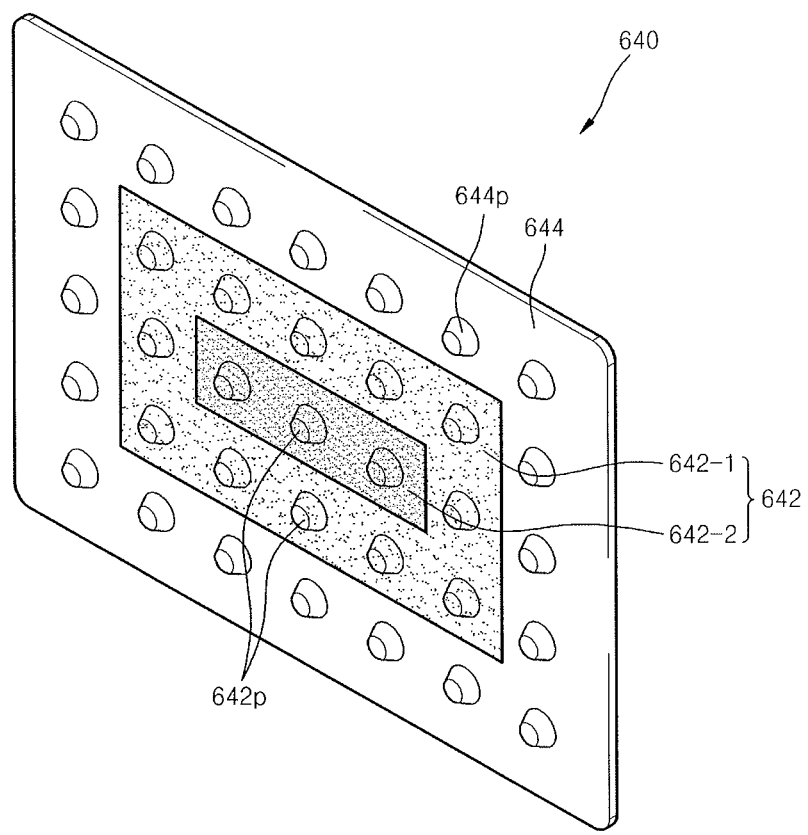
FIGS. 6 and 7 illustrate schematic perspective views of a barrier according to other embodiments.

FIG. 6 is a schematic perspective view of a barrier 640 according to another embodiment.

Referring to FIG. 6, the barrier 640 may include protruding portions 642p and 644p formed to protrude toward the neighboring unit batteries 120 between which the barriers 640 are disposed. The protruding portions 642p and 644p may form paths along which air flows between the neighboring unit batteries 120, as described above. The barrier 640 may include an inner region 642 disposed in the center thereof and an outer region 644 surrounding the inner region 642 in a vicinity of the inner region 642. The inner region 642 may include a plurality of inner regions. For example, the inner region 642 may include a first inner region 642-1 adjacent to the outer region 644 and a second inner region 642-2 formed inside from the inner region 642-1.

The inner region 642 may be formed of a material that is softer than that of the outer region 644 and may have elasticity increasing toward the center thereof The elasticity of the second inner region 642-2 may be greater than the elasticity of the first inner region 642-1. For example, both the first and second inner regions 642-1 and 642-2 may be formed of elastic materials such as rubber or silicone. The elasticity of the material of the second inner region 642-2 may be greater than that of the material of the first inner region 642-1.

The unit batteries 120 may actively expand in volume due to a swelling phenomenon with respect to a center portion of the cases 123 of the unit batteries 120 facing the barrier 640. The volume expansion due to the swelling phenomenon of the unit batteries 120 may be more effectively absorbed by further increasing the elasticity of the second inner region 642-2 corresponding to the center portion of the case 123, where the greatest volume expansion takes place.

Figure 7:
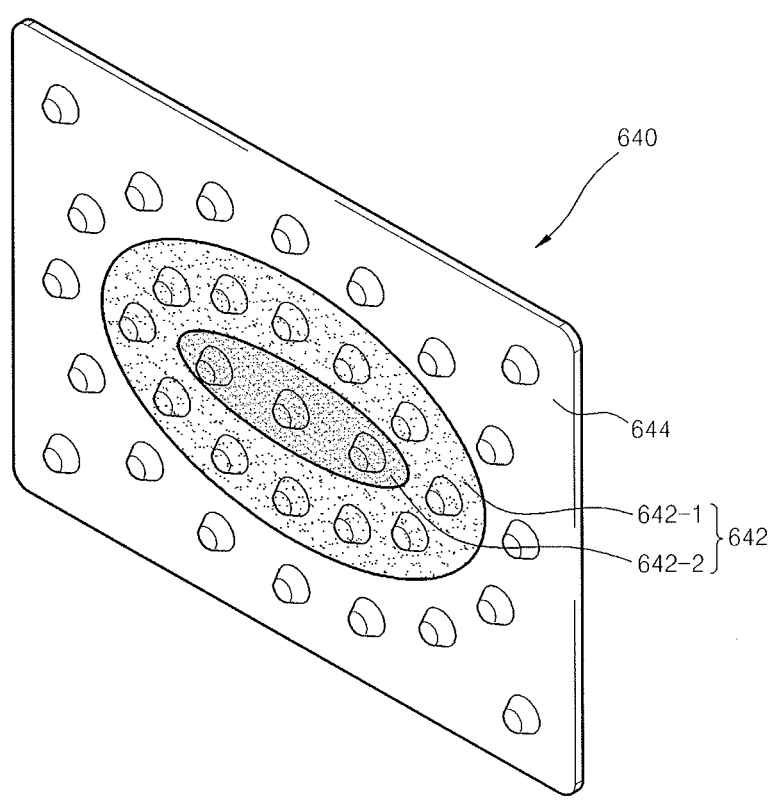

Although the first inner region 642-1 and the second inner region 642-2 are shown to have approximately rectangular shapes in the present embodiment, in other implementations, the first inner region 642-1 and the second inner region 642-2 may have other shapes. For example, the first inner region 642-1 and the second inner region 642-2 may have approximately oval shapes as shown in FIG. 7, or may have circular shapes according to another implementation.

Furthermore, although the inner region 642 is shown to include two inner regions, i.e. the first inner region 642-1 and the second inner region 642-2, in the present embodiment, in other implementations, the inner region may include more than two inner regions. For example, the inner region 642 may include three or more inner regions in which the elasticity of the inner region 642 increases toward the center thereof.

By way of summation and review, when a battery module is used for a long period of time, a structure of the battery module may become deformed due to various factors, for example, an expansion of the volume of the batteries and the heating thereof. Such deformation of the structure of the battery module may interrupt the stable operation of the batteries. Thus, it is desirable for a battery module to have a structure that may allow a stable maintenance thereof, even when the battery module is used for a long period of time.

According to the above-described embodiments, barriers formed of heterogeneous materials may be used to form paths along which air may flow between unit batteries. The barriers may easily absorb a volume expansion due to swelling of unit batteries. Even if unit batteries become swollen, the barriers may enable spaces between unit batteries to be maintained constant, thereby providing a battery module that may be capable of stably maintaining its shape even when the battery module is used for a long period of time.

Example embodiments have been disclosed herein, and although specific teens are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery module comprising:
a plurality of unit batteries arranged in one direction, wherein side surfaces of each of neighboring unit batteries face each other; and
barriers between the plurality of unit batteries, each barrier including an inner region and an outer region, the inner region having elasticity and the outer region being located in a vicinity of the inner region, the outer region having greater hardness than the inner region, wherein at least one of the inner region and the outer region further includes protruding portions that protrude perpendicularly from each barrier toward the neighboring unit batteries,
wherein the protruding portions are directly between and face the side surfaces of the neighboring unit batteries such that air flow paths are provided along the protruding portions between the facing side surfaces.

2. The battery module as claimed in claim 1, wherein the inner region and the outer region are formed of different materials.

3. The battery module as claimed in claim 1, wherein:
each barrier includes a plurality of holes, and
the inner region includes a cured elastic material filling the plurality of holes.

4. The battery module as claimed in claim 3, wherein the plurality of holes are located along a perimeter of the inner region at a location where the inner region and the outer region contact each other.

5. The battery module as claimed in claim 1, wherein:
each barrier is disposed between a neighboring first unit battery and a neighboring second unit battery among the plurality of unit batteries,
a first surface of the inner region faces the first unit battery,
a second surface of the inner region opposite to the first surface faces the second unit battery, and
the inner region absorbs volume expansions of the first unit battery and the second unit battery.

6. The battery module as claimed in claim 1, wherein the inner region is formed of silicone or rubber.

7. The battery module as claimed in claim 1, wherein the outer region is formed of a plastic material, a reinforced plastic material, or a metallic material having an insulated outer surface.

8. The battery module as claimed in claim 1, wherein an elasticity of the inner region increases in a direction from a portion of the inner region contacting the outer region to a center of the inner region.

9. The battery module as claimed in claim 1, wherein the outer region is non-elastic.

10. A battery module, comprising:
a plurality of unit batteries arranged in one direction;
barriers disposed between the plurality of unit batteries; and
a housing surrounding the plurality of unit batteries between which the barriers are disposed,
wherein:
each of the barriers includes a soft inner region formed of an elastic material and located in a center of each barrier and a hard outer region formed in a vicinity of the inner region and surrounding the inner region, wherein the barriers include protruding portions that protrude perpendicularly from each barrier toward the neighboring unit batteries between which the barriers are disposed, and the protruding portions are directly between and face side surfaces of the neighboring unit batteries such that a gap is provided along the protruding portions between the facing side surfaces.

11. The battery module as claimed in claim 10, wherein:
each barrier includes a plurality of holes, and
the inner region includes a cured elastic material filling the plurality of holes.

12. The battery module as claimed in claim 10, wherein:
the protruding portions include protruding portions in the outer region, and
the protruding portions that are in the outer region maintain a constant space between the neighboring unit batteries.

13. The battery module as claimed in claim 10, wherein the inner region absorbs volume expansions of the neighboring unit batteries and is elastically deformable.

14. The battery module as claimed in claim 10, wherein the elastic material includes silicone or rubber.

15. The battery module as claimed in claim 10, wherein the outer region is formed of a plastic material, a reinforced plastic material, or a metallic material having an insulated outer surface.

16. The battery module as claimed in claim 10, wherein the elasticity of the inner region increases in a direction from a portion of the inner region contacting the outer region to the center of the inner region.

17. The battery module as claimed in claim 10, wherein:
the inner region includes a first inner region adjacent to the outer region and a second inner region located inside the first inner region, and
an elasticity of the second inner region is greater than an elasticity of the first inner region.

18. The battery module as claimed in claim 10, wherein cooling holes are formed in sides of the housing at locations corresponding to the barriers.

19. The battery module as claimed in claim 1, wherein each unit battery is a prismatic battery.

20. The battery module as claimed in claim 10, wherein each unit battery is a prismatic battery.

\* \* \* \* \*